United States Patent
Tonoki

(10) Patent No.: US 11,390,044 B2
(45) Date of Patent: Jul. 19, 2022

(54) AUTOMATED FIBER BUNDLE PLACEMENT APPARATUS

(71) Applicant: TSUDAKOMA KOGYO KABUSHIKI KAISHA, Ishikawa-ken (JP)

(72) Inventor: Shota Tonoki, Ishikawa-ken (JP)

(73) Assignee: TSUDAKOMA KOGYO KABUSHIKI KAISHA, Ishikawa-Ken (JP)

(*) Notice: Subject to any disclaimer, the term of this patent is extended or adjusted under 35 U.S.C. 154(b) by 0 days.

(21) Appl. No.: 17/241,868

(22) Filed: Apr. 27, 2021

(65) Prior Publication Data
US 2021/0347131 A1 Nov. 11, 2021

(30) Foreign Application Priority Data
May 11, 2020 (JP) .............................. JP2020-083220

(51) Int. Cl.
*B29C 70/38* (2006.01)
*B29C 70/16* (2006.01)

(52) U.S. Cl.
CPC ............ *B29C 70/384* (2013.01); *B29C 70/16* (2013.01)

(58) Field of Classification Search
CPC ....... B29C 70/16; B29C 70/38; B29C 70/382; B29C 70/384; B29C 70/386; B29C 70/388; B29C 70/54; B29C 70/546; B29C 70/547
See application file for complete search history.

(56) References Cited

U.S. PATENT DOCUMENTS

| 5,358,594 A * | 10/1994 | Darrieux | ............... B29C 70/388 156/433 |
| 5,518,564 A | 5/1996 | Darrieux | |
| 2003/0052212 A1 | 3/2003 | Anderson et al. | |
| 2007/0044919 A1* | 3/2007 | Hoffmann | ............. B29C 70/384 156/430 |

FOREIGN PATENT DOCUMENTS

| EP | 0557158 A1 | 8/1993 |
| EP | 1757433 A1 | 2/2007 |
| JP | 2019-130914 A | 8/2019 |

OTHER PUBLICATIONS

Sep. 23, 2021, European Search Report issued for related EP Application No. 21171271.6.

* cited by examiner

*Primary Examiner* — George R Koch
(74) *Attorney, Agent, or Firm* — Paratus Law Group, PLLC

(57) ABSTRACT

An automated fiber bundle placement apparatus includes a supply device that supplies a plurality of fiber bundles, a placement head that places each of the fiber bundles on a placement die, an articulated robot, and a guide mechanism that guides the fiber bundles. The placement head includes an introduction hole that introduces the fiber bundles, a plurality of feeding mechanisms that feed the fiber bundles, and a guide roller that corresponds to each of the feeding mechanisms. The placement head includes an S-shaped guide provided for each of the introduction holes, and having a pair of rollers provided so that axes thereof are parallel to each other and having different positions in a direction of a center line of the introduction hole, and a support body supporting the pair of rollers and provided to be rotatable around the center line.

3 Claims, 6 Drawing Sheets

AUTOMATED FIBER BUNDLE PLACEMENT APPARATUS

CROSS-REFERENCE TO RELATED APPLICATIONS

The present application claims priority from Japanese Patent Application No. 2020-083220, filed May 11, 2020, the entire content of which is incorporated herein by reference.

BACKGROUND OF THE INVENTION

Field of the Invention

The present invention relates to an automated fiber bundle placement device. The automated fiber bundle placement device includes a supply device in which a plurality of bobbins around which fiber bundles are wound are installed, and configured to supply the fiber bundles from each of the bobbins, a placement head for placing each of the fiber bundles supplied from the supply device on a placement die, the placement head including a pressing unit that presses the fiber bundle onto the placement die, an articulated robot moving the placement head for the placement, the articulated robot having the placement head attached thereto via a pivoting mechanism in which the placement head is attached to a pivotally driven pivoting unit, and a guide mechanism provided in the articulated robot, the guide mechanism guiding the fiber bundle supplied from the supply device toward the placement head. The placement head includes an introduction hole for introducing the fiber bundle guided from the guide mechanism into the placement head, the introduction hole being formed for each of the fiber bundles, a plurality of feeding mechanisms provided for each route of the fiber bundle to feed the fiber bundle introduced from the introduction hole toward the pressing unit, and a guide roller provided on an upstream side of the route with respect to the feeding mechanisms in a form corresponding to each of the feeding mechanisms.

Background Art

As an automated fiber bundle placement device, an automated fiber placement (AFP) device which places a narrow fiber bundle on a placement die is known. In the present application, the "fiber bundle" refers to a material such as a so-called tow prepreg formed in a tape shape by impregnating a bundle of a plurality of reinforcing fibers (carbon fibers or glass fibers) with a matrix resin. As the AFP device, there is a device configured to place the fiber bundle on the placement die by using an articulated robot.

As the AFP device, Patent Literature 1 discloses a device including a unwinding mechanism configured to unwind (feed) the fiber bundle from a bobbin around which the fiber bundle is wound, a sticking head as a placement head for the placement, an articulated robot to which the sticking head (placement head) is attached, and a guide mechanism that guides the fiber bundle from the unwinding mechanism toward the sticking head (placement head). In the AFP device disclosed in Patent Literature 1, the placement head (sticking head) has a roller as pressing unit that presses the fiber bundle on the placement die (sticking target surface), a pressing member such as a shoe, and a feeder as a feeding mechanism that feeds the fiber bundle toward the pressing member.

The device disclosed in Patent Literature 1 is the AFP device that performs the placement for a single (one) fiber bundle. However, as a known AFP device, there also exists a device that performs the placement for a plurality of fiber bundles. In the AFP device configured to perform the placement for the plurality of fiber bundles in this way, the feeding mechanism in the placement head is provided for each of the plurality of fiber bundles. As the placement head in the AFP device, a placement head is also known in which an introduction hole for introducing the fiber bundles into the placement head is formed corresponding to each of the fiber bundles, and a guide roller that guides the fiber bundles is provided in a route of the fiber bundles between the introduction hole formed corresponding to each of the fiber bundles and the feeding mechanism.

CITATION LIST

Patent Literature

Patent Literature 1: JP2019-130914A

SUMMARY OF THE INVENTION

Incidentally, in the AFP device as described above, the placement head is attached to a tip of an arm of the articulated robot. However, depending on the AFP device, a configuration is adopted as follows. A pivoting mechanism for causing the placement head to pivot is attached to the tip of the arm, and the placement head is attached to the arm via the pivoting mechanism. In the AFP device configured in this way, the articulated robot causes the placement head to pivot in accordance with a movement direction of the placement head when the placement is performed.

In the AFP device, the guide mechanism includes a roll-shaped guide (tow guide) that guides the fiber bundle, and is provided to be fixed to the arm. Therefore, when the placement head pivots as described above, an orientation of a guide surface (peripheral surface) of the tow guide and an orientation of a guide surface (peripheral surface) of a guide roller in the placement head are in different states. Accordingly, the fiber bundle is in a twisted state as much as an amount corresponding to a pivoting amount of the placement head, between the guide mechanism and the guide roller. As a result of guiding the fiber bundle toward the guide roller in the twisted state, disadvantages may occur in the placement depending on a twisted amount thereof in some cases.

Therefore, an object of the present invention is to provide an automated fiber bundle placement apparatus that prevents the disadvantages in the placement as much as possible by reducing the twisted amount of the fiber bundle guided toward the guide roller.

According to the present invention, there is provided the automated fiber bundle placement apparatus including a supply device in which a plurality of installed bobbins around which fiber bundles are wound are installed, and configured to supply the fiber bundles from each of the bobbins, a placement head for placing each of the fiber bundles supplied from the supply device on a placement die, the placement head including a pressing unit that presses the fiber bundle onto the placement die, an articulated robot moving the placement head for the placement, the articulated robot having the placement head attached thereto via a pivoting mechanism in which the placement head is attached to a pivotally driven pivoting unit, and a guide mechanism provided in the articulated robot, the guide mechanism guiding the fiber bundle supplied from the supply device toward the placement head. The placement head includes an introduction hole for introducing the fiber bundle guided from the guide mechanism into the placement head, the introduction hole being formed for each of the fiber bundles, a plurality of feeding mechanisms provided for each route of the fiber bundle to feed the fiber bundle introduced from the introduction hole toward the pressing unit, and a guide roller provided on an upstream side of the route with respect to the feeding mechanisms in a form corresponding to each of the feeding mechanisms.

In the automated fiber bundle placement apparatus according to an aspect of the present invention. In order to achieve the above object, the placement head includes an S-shaped guide provided for each of the introduction holes, the S-shaped guide having a pair of rollers provided so that axes thereof are parallel to each other, and having different positions in a direction of a center line of the introduction hole, and a support body supporting the pair of rollers and provided to be rotatable around the center line.

In the automated fiber bundle placement apparatus of the present invention, the placement head may include a regulation guide provided between the guide roller and the introduction hole, the regulation guide having a pair of regulation members provided to pinch the fiber bundle therebetween so that the fiber bundle is in sliding contact with the pair of regulation members. The regulation guide may be configured to be common to two or more of the routes by the regulation members extending in a width direction of the placement head.

According to the automated fiber bundle placement apparatus of the present invention, the fiber bundle is guided between the guide mechanism and the guide roller in a form via the S-shaped guide as described above. In this manner, when the placement head pivots as described above, a position of the S-shaped guide is changed due to the pivoting. Accordingly, the S-shaped guide connected to a tow guide in the fixed guide mechanism by the fiber bundle pivots around the center line. However, the S-shaped guide is also connected to the guide roller on a downstream side thereof by the fiber bundle. Accordingly, a pivoting amount thereof does not have such a size that an orientation of a guide surface of the roller is aligned with an orientation of a guide surface of the tow guide, and has such a size that the guide surface of the roller faces a side in the orientation of the guide surface of the guide roller rather than the orientation of the guide surface of the tow guide. Therefore, in this state, a difference between the orientation of the guide surface of the S-shaped guide (roller) and the orientation of the guide roller is smaller than a difference between the orientation of the guide surface of the tow guide and the orientation of the guide surface of the guide roller.

The fiber bundle is guided to the guide roller after being guided by the S-shaped guide in this state. Accordingly, the twisted amount of the fiber bundle reaching the guide roller is smaller than that in a case where the fiber bundle is guided to the guide roller from the tow guide without passing through the S-shaped guide. Therefore, it is possible to prevent the above-described disadvantages in the placement as much as possible.

In the automated fiber bundle placement apparatus according to the present invention, the regulation guide as described above is provided between the guide roller and the introduction hole. In this manner, the fiber bundle guided by the S-shaped guide pivoting as described above can be guided in a state where the fiber bundle is pinched by the pair of regulation members and is in sliding contact with each of the regulation members on a downstream side thereof (guide roller side). Therefore, the orientation of the fiber bundle passing through the S-shaped guide is in a state of being regulated by the regulation guide. Accordingly, the orientation of the fiber bundle between the regulation guide and the guide roller is always constant. In this manner, even when the placement head pivots for the placement, the orientation of the fiber bundle reaching the guide roller is not changed. Accordingly, there is no disadvantage in the placement which may be caused by the above-described twisted state.

The regulation guide is configured so that the pair of regulation members extend in the width direction of the placement head. Accordingly, one regulation guide can be common to the routes of two or more fiber bundles. In this manner, the above-described advantageous effect can be achieved with a simpler configuration, compared to a case where the regulation guide is provided for each route of the fiber bundle.

DETAILED DESCRIPTION OF THE INVENTION

Hereinafter, an embodiment of an automated fiber bundle placement apparatus according to the present invention will be described with reference to FIGS. 1 to 6.

Figure 1:
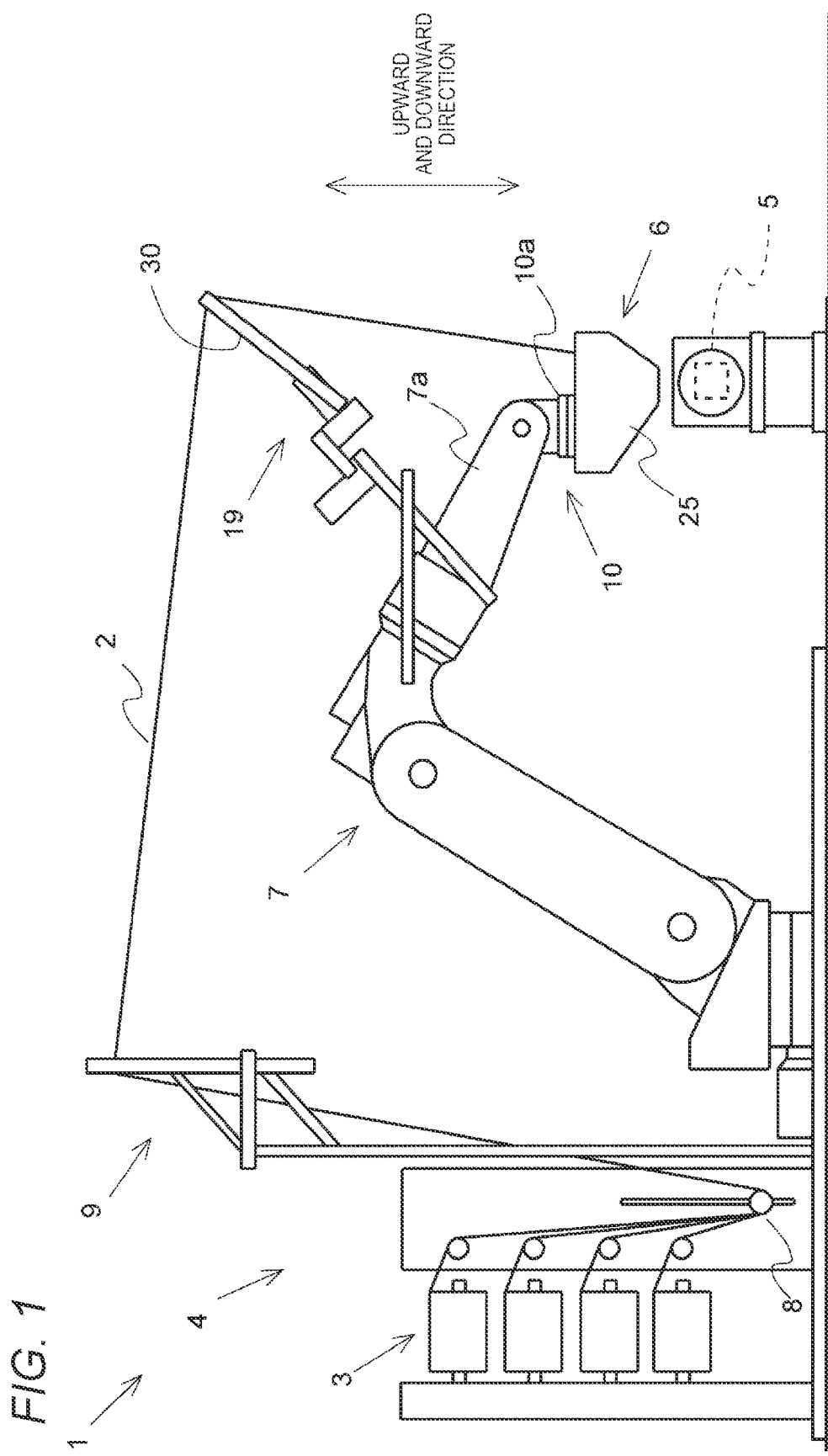
FIG. 1 is a side elevation illustrating an automated fiber bundle placement apparatus to which the present invention is applied.

As illustrated in FIG. 1, an automated fiber bundle placement apparatus 1 includes a supply device 4 in which a bobbin 3 around which a fiber bundle 2 is wound is installed, a placement head 6 for placing the fiber bundle 2 supplied from the supply device 4 on a placement die 5, and an articulated robot 7 that moves the placement head 6 for the placement. In the present embodiment, the automated fiber bundle placement apparatus 1 is configured so that the placement of 16 fiber bundles 2 can be simultaneously performed. Therefore, 16 bobbins 3 are installed in the supply device 4, although only four on a front side are illustrated in the drawing.

The supply device 4 includes a guide unit 9 that guides the fiber bundle 2 pulled out from each of the bobbins 3 toward the articulated robot 7 side. The guide unit 9 includes a guide member (not illustrated) provided for each of the fiber bundles 2 to individually guide each of the fiber bundles 2, and is configured so that the guide member guides each of the fiber bundles 2 to a position higher than that of the articulated robot 7. The supply device 4 includes a dancer roll 8 common to each of the fiber bundles 2, as a configuration for adjusting tension of each of the fiber bundles 2 in a route of the fiber bundles 2 between each of the bobbins 3 and the guide unit 9. According to the configuration, each of the fiber bundles 2 is adjusted to have proper tension between the bobbin 3 and the guide unit 9, and is pulled out to the articulated robot 7 side in a proper tension state.

A guide mechanism 19 for guiding each of the fiber bundles 2 guided by the guide unit 9 as described above is attached to the articulated robot 7. The guide mechanism 19 is attached to an arm 7a on a tip side in the articulated robot 7. The guide mechanism 19 includes a tow guide provided for each of the fiber bundles 2 in order to individually guide each of the fiber bundles 2, and is configured so that each tow guide is supported by a support member 30. The guide mechanism 19 is provided so that the support member 30 extends upward above the arm 7a and guides each of the fiber bundles 2 on a tip side of the support member 30.

Figure 2:
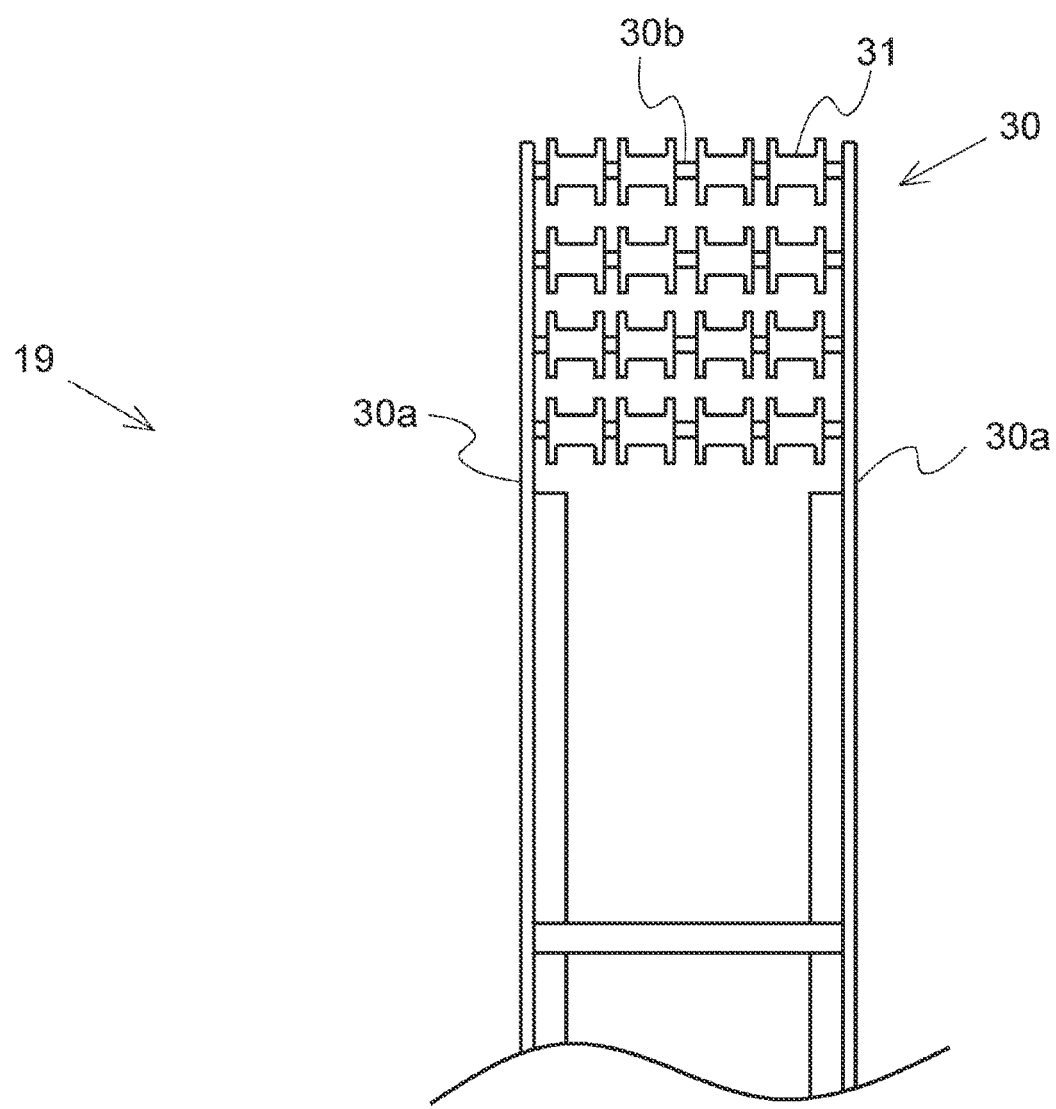
FIG. 2 is a plan of a guide mechanism illustrated in FIG. 1.

More specifically, as illustrated in FIG. 2, the guide mechanism 19 includes 16 tow guides 31 corresponding to each of the fiber bundles 2. In the present embodiment, each of the tow guides 31 is configured to include a hollow cylindrical member having a flange portion. The 16 tow guides 31 are supported by the support member 30 mainly having a pair of side plates 30a and 30a. The support member 30 has four support shafts 30b provided in a form of being laid between both the side plates 30a and 30a, and the respective tow guides 31 are provided in a form in which every four of the tow guides 31 are supported by each of the support shafts 30b. The tow guide 31 is supported by the support shaft 30b in a form in which the support shaft 30b is inserted into a hole of the hollow cylindrical tow guide 31, and each of the tow guides 31 can pivot around the support shaft 30b.

In the automated fiber bundle placement apparatus 1, the fiber bundle 2 pulled out from each of the bobbins 3 is pulled out from the supply device 4 (guide unit 9) at a position higher than that of the articulated robot 7 in an upward and downward direction. Thereafter, the fiber bundle 2 reaches the guide mechanism 19 in a manner of passing above the articulated robot 7. Each of the fiber bundles 2 is turned into a form of being guided to the corresponding tow guide 31 in the guide mechanism 19, and is guided to the placement head 6 attached to a tip of the arm 7a in the articulated robot 7.

The placement head 6 is attached to the arm 7a in the articulated robot 7 via a pivoting mechanism 10. The pivoting mechanism 10 has a pivotally driven pivoting unit 10a, and the placement head 6 is attached to the pivoting unit 10a. In this manner, the placement head 6 is provided to be driven to turn by the pivoting mechanism 10 on a tip side of the articulated robot 7.

Figure 3:
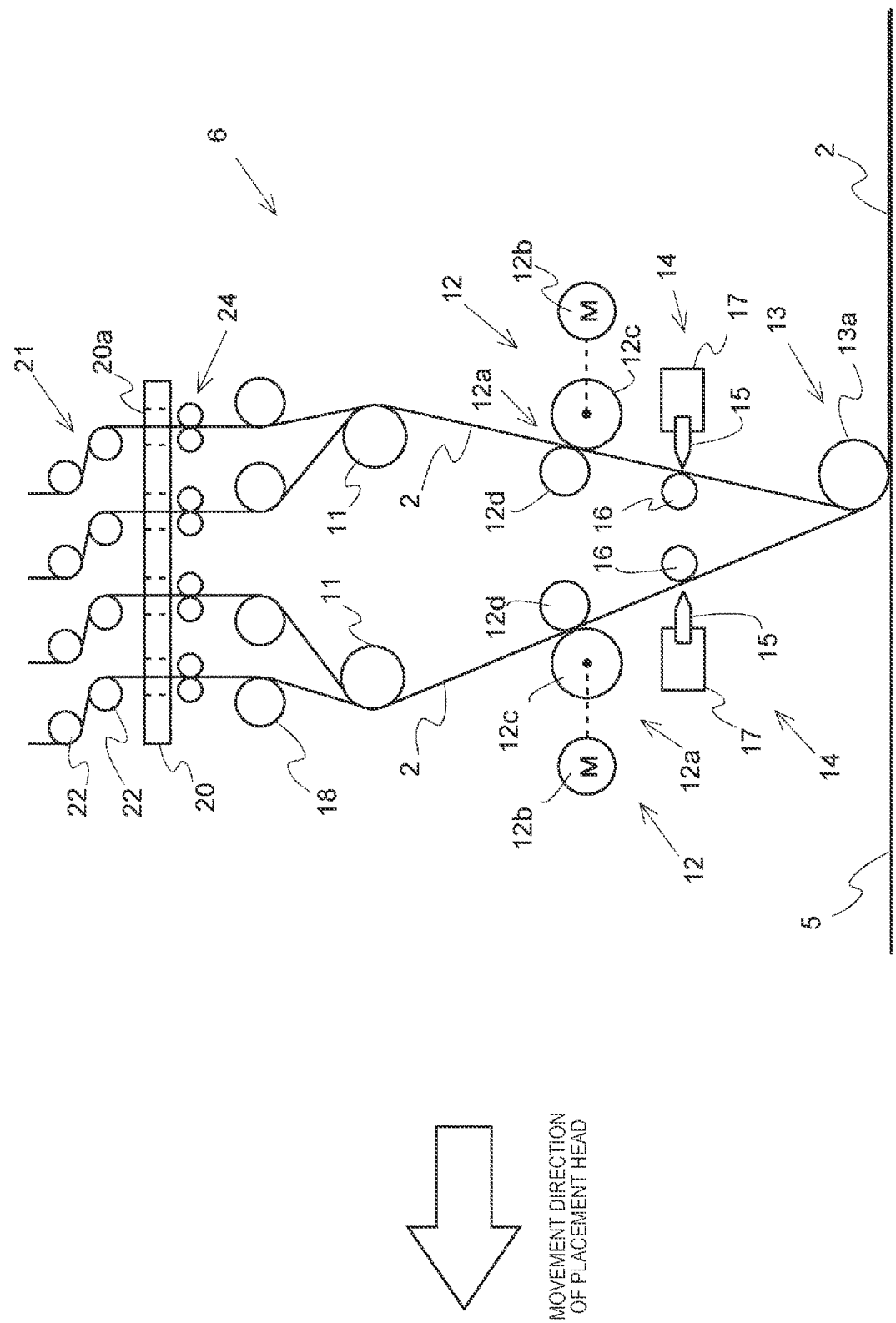
FIG. 3 is a view for describing a placement head of the automated fiber bundle placement apparatus.
Figure 4:
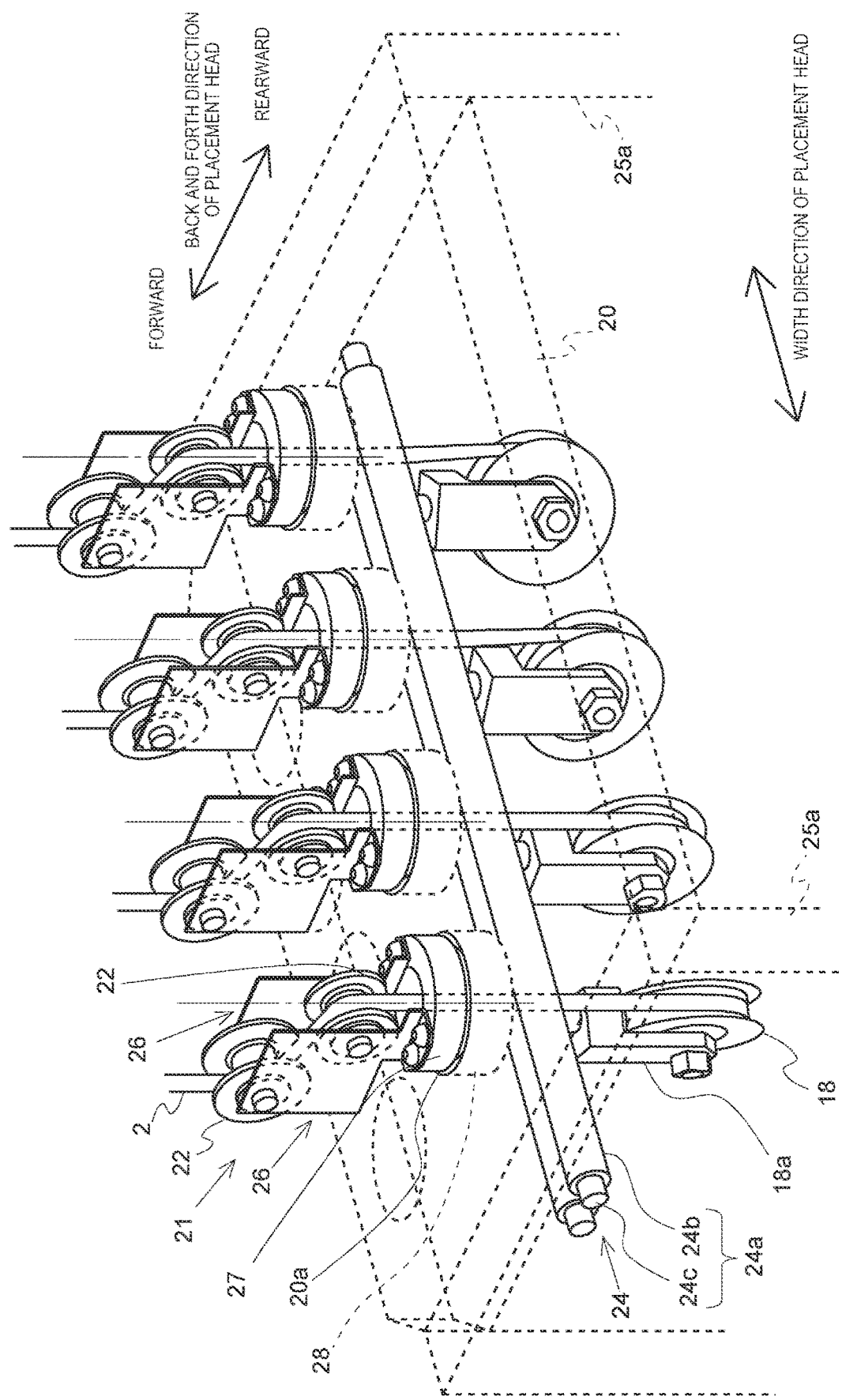
FIG. 4 is a view for describing an S-shaped guide according to the present invention.

As illustrated in FIG. 3, the placement head 6 includes a pressing device 13 that presses the fiber bundle 2 onto the placement die 5, a feeding mechanism 12 that feeds the fiber bundle 2 toward the pressing device 13, the feeding mechanism 12 including a plurality of feeding mechanisms 12a provided for each route of the fiber bundle 2, and a cutting device 14 that cuts the fiber bundle 2 between pressing device 13 and the feeding mechanism 12. In addition to the configuration elements, the placement head 6 includes a guide roller 11 provided on an upstream side of the route of the fiber bundle 2 with respect to each of the feeding mechanisms 12a in the feeding mechanism 12 and guiding the fiber bundle 2 toward the feeding mechanism 12 (feeding mechanism 12a), and a feeding roller 18 provided on an upstream side of the guide roller 11 and guiding the fiber bundle 2 to the guide roller 11. The placement head 6 mainly has a support frame 25 including a pair of side walls 25a and 25a, and the configuration elements are supported between the pair of side walls 25a and 25a.

With regard to each of the configuration elements, the pressing device 13 includes a pressing unit 13a that presses the fiber bundle 2 onto the placement die 5, and a pressing mechanism (not illustrated) that causes the pressing unit 13a to generate a pressing force toward the placement die 5. The pressing unit 13a is a member common to each of the fiber bundles 2, and is a so-called compaction roller which is a roller-shaped member provided to be rotatable in the present embodiment.

With regard to the guide roller 11, the guide roller 11 is provided inside the placement head 6 (support frame 25) in a form in which an axial direction thereof coincides with an axial direction of the pressing unit (compaction roller) 13a, and the guide roller 11 is supported by a support member (not illustrated) laid between the side walls 25a and 25a in the support frame 25. In the present embodiment, in order to divide the 16 fiber bundles 2 guided to the placement head 6 as described above into two groups, two guide rollers 11 are provided at different positions in a back and forth direction (direction coinciding with a direction in which the fiber bundle 2 is placed on the placement die 5 in association with the placement). Each of the fiber bundles 2 is divided and guided by any one of the guide rollers 11. In this manner, the 16 fiber bundles 2 are divided into the two groups inside the placement head 6, and each of the groups is guided to the guide rollers 11 at the different positions in the back and forth direction so that each of the groups reaches the pressing unit 13a.

Each of the groups of the fiber bundles 2 is formed of every eight fiber bundles 2 as a result of equally dividing the 16 fiber bundles 2. Therefore, a route for the 16 fiber bundles 2 is a route for every eight fiber bundles 2 at two positions different in the back and forth direction. The route for each of the fiber bundles 2 inside the placement head 6 reaches the pressing unit 13a common to each of the fiber bundles 2 by way of the guide roller 11 to which the fiber bundle 2 corresponds.

An upper portion of the support frame 25 in the placement head 6 has a plate-shaped base member 20 extending between the pair of side walls 25a and 25a. The base member 20 has an introduction hole 20a for introducing the fiber bundle 2 from the guide mechanism 19 into the placement head 6 in a form corresponding to each of the fiber bundles 2. That is, 16 introduction holes 20a are formed in the base member 20. In the present embodiment, 16 fiber bundles 2 are individually guided by the tow guides 31, every four of which are respectively supported by the four support shafts Sob in the guide mechanism 19, and the fiber bundles 2 are introduced into the placement head 6 in the four groups of each support shaft 30b (four). Therefore, the introduction holes 20a formed in the base member 20 in the support frame 25 of the placement head 6 are formed so that every four are aligned in four rows in the width direction of the placement head 6.

As described above, 16 feeding rollers 18 are provided above the guide roller 11 in a form corresponding to each of the introduction holes 20a. Each of the feeding rollers 18 is supported in a form in which the feeding roller 18 is located below the base member 20 by a suspending member 18a provided corresponding to each of the feeding rollers 18, and suspended from and attached to a lower surface (surface facing the inside of the support frame 25) of the base member 20. In this manner, each of the feeding rollers 18 is provided inside the placement head 6 (support frame 25) to be located between the corresponding introduction hole 20a and the guide roller 11. The fiber bundle 2 introduced from each of the introduction holes 20a is guided to the guide roller 11 by the corresponding feeding roller 18.

The feeding mechanism 12 has the feeding mechanism 12a provided for each route of the fiber bundle 2 and a driving motor 12b provided for each feeding mechanism 12a to rotationally drive the feeding mechanism 12a. In the present embodiment, each of the feeding mechanisms 12a is configured to include a pair of rollers 12c and 12d provided to nip the fiber bundle 2. In each of the feeding mechanisms 12a, one of the pair of rollers 12c and 12d (roller 12c in the illustrated example) is rotationally driven by the driving motor 12b so that the other is driven to rotate. In this manner, each of the feeding mechanisms 12a feeds the fiber bundle 2 toward the pressing unit 13a in the pressing device 13.

The cutting device 14 includes a cutting blade 15 provided for each route of the fiber bundle 2, a securing member 16 provided to pinch the route with the cutting blade 15, and a cutting blade driving mechanism 17 provided for each of the cutting blades 15 to perform a cutting operation for causing the cutting blade 15 to cut the fiber bundle 2. The cutting blade 15 is provided so that an extending direction of a blade line (blade edge) is parallel to the axial direction and is substantially orthogonal to a traveling direction of the fiber bundle 2. In the present embodiment, the securing member 16 is a so-called anvil roller which is a roller-shaped member provided to be rotatable, and is provided for each of the cutting blades 15. The cutting device 14 cuts the fiber bundle 2 in cooperation with the cutting blade 15 and the securing member 16 by causing the cutting blade driving mechanism 17 to perform the cutting operation of the cutting blade 15.

In the automated fiber bundle placement apparatus configured as described above, in the present invention, the placement head includes an S-shaped guide that guides the fiber bundle 2 by a pair of rollers, and the S-shaped guide is provided for each of the introduction holes 20a. In addition to the S-shaped guide, the placement head of the present embodiment includes a regulation guide configured to include a pair of regulation members for guiding the fiber bundle 2 between the introduction hole 20a and the guide roller 11. However, the regulation guide of the present embodiment is configured to be common to the routes of two or more of the fiber bundles 2 by the regulation member extending in the width direction of the placement head. An embodiment (present embodiment) of the automated fiber bundle placement apparatus will be described in detail below with reference to FIGS. 4 to 6.

The S-shaped guide 21 is configured to include a pair of rollers 22 and 22 and a support body 23 that supports the pair of rollers 22 and 22. The S-shaped guide 21 is provided for each of the introduction holes 20a as described above. More specifically, the configuration is as follows.

Each roller 22 in the pair of rollers 22 and 22 has a hollow cylindrical shape, and is a member having a flange portion. The support body 23 has a pair of support plates 26 and 26 for supporting the pair of rollers 22 and 22. The support plate 26 is formed of a plate-shaped member, and is a member having a rectangular portion (support unit) when viewed in a plate thickness direction. Each roller 22 is supported so that respective axes are parallel to each other between support units 26a and 26a of the pair of support plates 26 and 26 in the support body 23. However, both the rollers 22 and 22 are supported at different positions in a long side direction and a short side direction of the support unit 26a.

In addition to the pair of support plates 26 and 26, the support body 23 includes a hollow cylindrical member 27 to which the pair of support plates 26 and 26 are attached, and a bearing 28 to which the cylindrical member 27 is attached. More specifically, the cylindrical member 27 is a member formed in a hollow cylindrical shape having a through hole 27a. Each of the support plates 26 has an attachment portion 26b that is continuous with the support unit 26a on one end side in the long side direction, and that has a portion extending in the plate thickness direction of the support unit 26a. The pair of support plates 26 and 26 that support the pair of rollers 22 and 22 as described above is attached to each of the attachment portions 26b in a form in which the long side direction of an end surface on one end side of the cylindrical member 27 coincides with a penetrating direction of the through hole 27a in the cylindrical member 27. Therefore, the pair of rollers 22 and 22 is in a supported state at different positions in the penetrating direction (direction of a center line of the through hole 27a) in the cylindrical member 27.

The cylindrical member 27 is formed so that a portion on the other end side (side opposite to one end side to which the support plate 26 is attached as described above) from a substantially intermediate portion in the penetrating direction has an outer diameter smaller than that of the one end side. In the support body 23 including the cylindrical member 27, the bearing 28 is externally fitted to the small diameter portion of the cylindrical member 27.

Each of the S-shaped guides 21 including the support body 23 and the pair of rollers 22 and 22 supported by the support body 23 which are configured in this way is attached to the base member 20 of the support frame 25 in the placement head 6, in a form in which the bearing 28 in the support body 23 is internally fitted to the corresponding introduction hole 20a. However, the attachment is performed in a form in which the pair of rollers 22 and 22 is located above the base member 20.

In the attached state, the center line (center line direction) of the through hole 27a in the cylindrical member 27 of the support body 23 and the center line (center line direction) of the introduction hole 20a are in a coincident state. Since the bearing 28 is attached as described above, the S-shaped guide 21 (support body 23) is in a state of being rotatable around the center line of the introduction hole 20a with respect to the base member 20. As described above, the S-shaped guide 21 (cylindrical member 27 in the support body 23) is attached to the base member 20 in a form of being fitted to the introduction hole 20a. In this manner, the fiber bundle 2 from the guide mechanism 19 can be introduced into the placement head 6 from the through hole 27a in the cylindrical member 27.

The regulation guide 24 is provided between the introduction hole 20a and the guide roller 11 as described above. However, the placement head 6 of the present embodiment includes the feeding roller 18 as described above, and the regulation guide 24 is provided between the feeding roller 18 and the introduction hole 20a. In the placement head 6 of the present embodiment, the introduction holes 20a are formed in the base member 20 so that every four are aligned in four rows in the width direction of the placement head 6 as described above. In the placement head 6 of the present embodiment, one regulation guide 24 is provided in a form corresponding to the four introduction holes 20a formed to be aligned in one row. That is, in the present embodiment, the regulation guide 24 is common to the four introduction holes 20a (routes of the fiber bundles 2). In the present embodiment, the introduction holes 20a are formed to be aligned in four rows. Accordingly, the placement head 6 includes four regulation guides 24.

More specifically, with regard to the four regulation guides 24 provided in this way, each of the regulation guides 24 is configured to include regulation rollers 24a and 24a as the pair of regulation members. Each of the regulation rollers 24a has a cylindrical roller member 24h and a rod-shaped shaft 24c penetrating the roller member 24b. However, the regulation roller 24a is configured so that the shaft 24c protrudes from both end portions of the roller member 24b and the roller member 24b is rotatable with respect to the shaft 24c.

Figure 5:
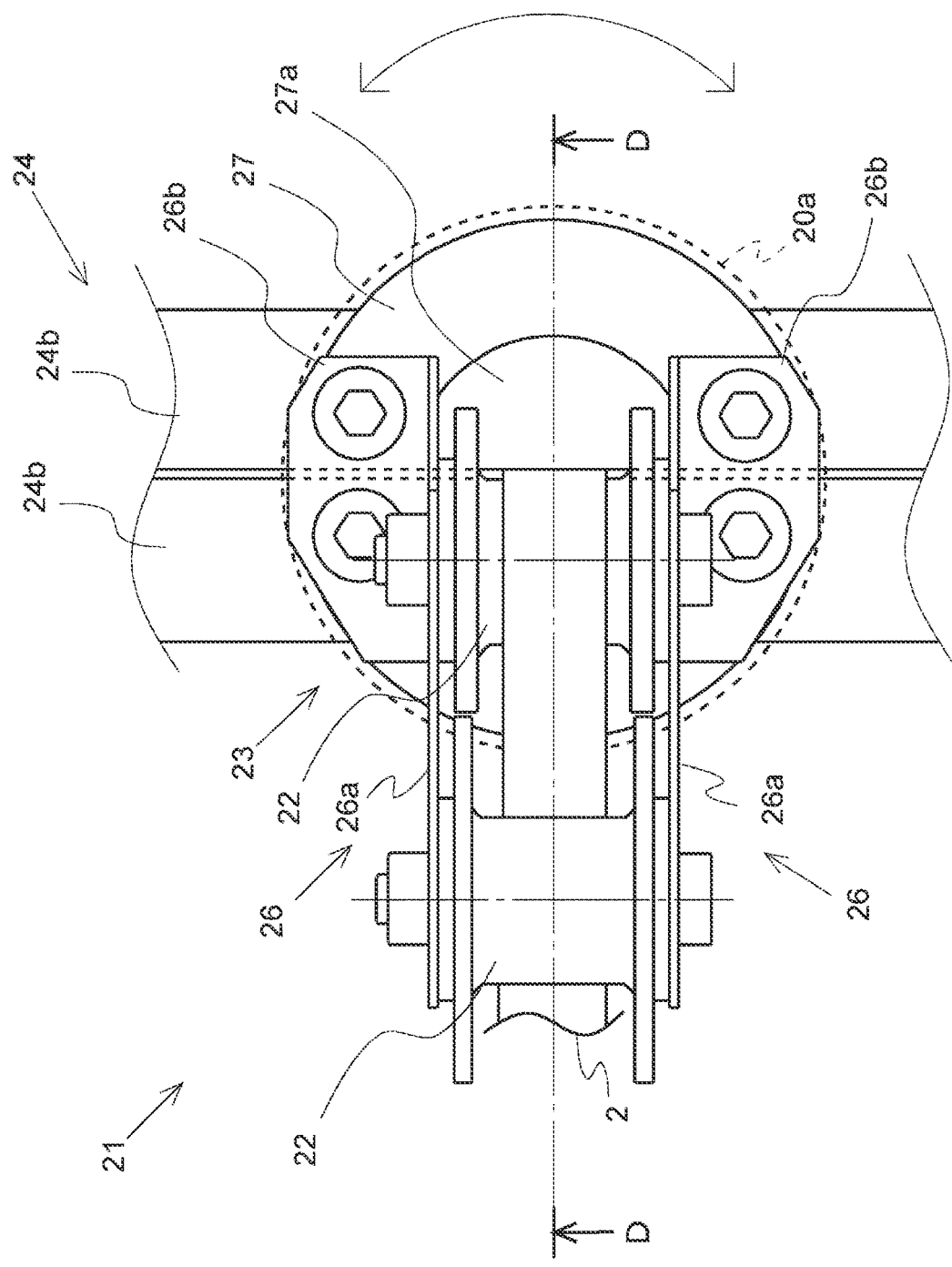
FIG. 5 is a plan of the S-shaped guide.
Figure 6:
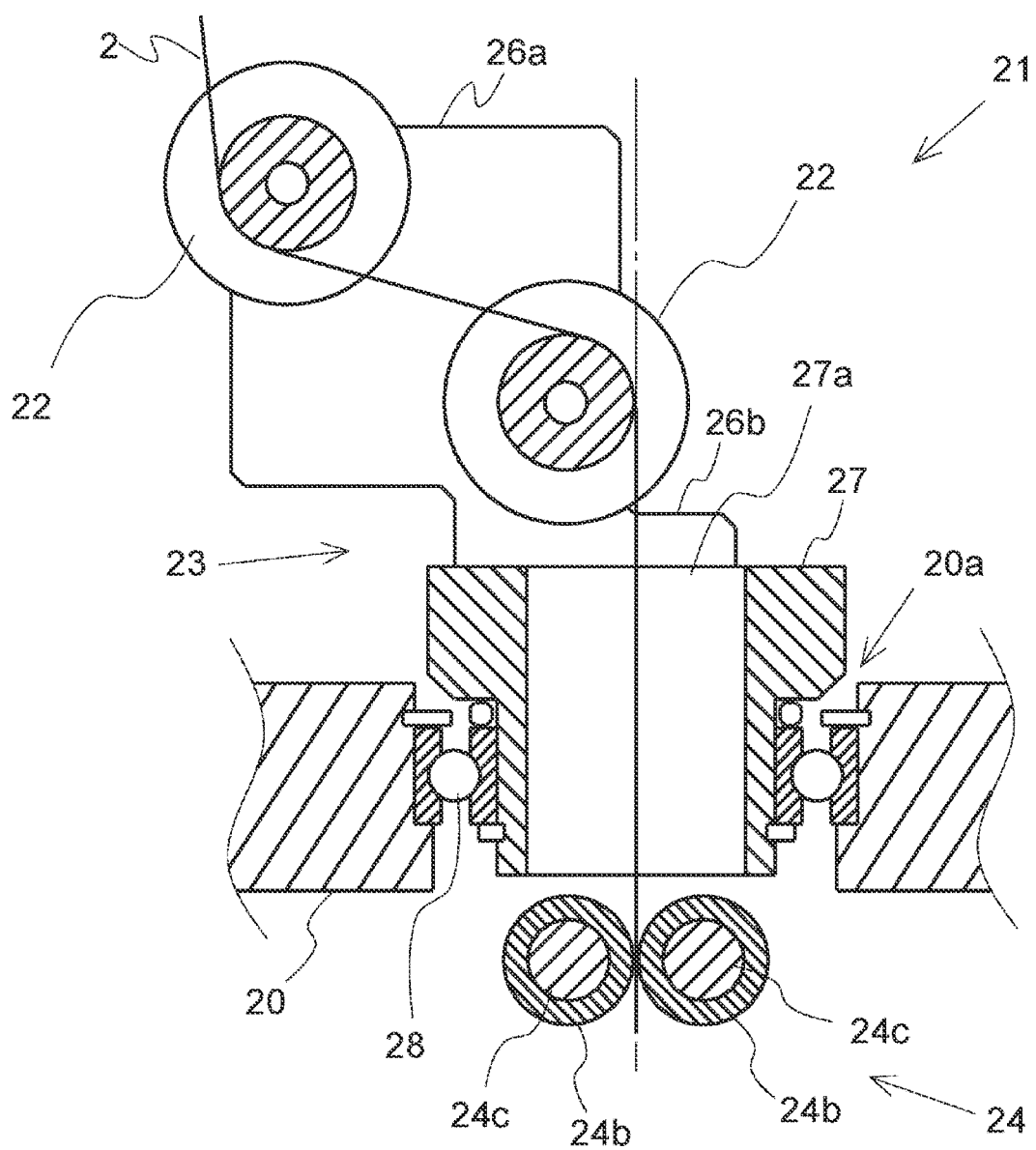
FIG. 6 is a sectional drawing taken along line D-D in FIG. 5.

Each of the regulation guides 24 (pair of regulation rollers 24a and 24a) is supported by the support frame 25 in the placement head 6 in the shaft 24c. More specifically, the regulation roller 24a in each of the regulation guides 24 is supported by the support frame 25 in a form in which the shaft 24c is laid between the pair of side walls 25a and 25a in the support frame 25. Therefore, each of the regulation rollers 24a is provided to extend in the width direction of the placement head 6. However, in each of the regulation guides 24, the pair of regulation rollers 24a and 24a is provided to be slightly separated as illustrated in FIGS. 5 and 6. A size of the clearance is formed so that both the regulation rollers 24a and 24a are in contact with the fiber bundle 2 in a state where the fiber bundle 2 passes through the clearance. When viewed in the direction of the center line of the introduction hole 20a, each of the regulation guides 24 is provided so that the center of the introduction hole 20a is located in the middle of the clearance.

In the automated fiber bundle placement apparatus according to the present embodiment described above, the respective fiber bundles 2 individually guided from the tow guide 31 in the guide mechanism 19 are sequentially wound around the pair of rollers 22 and 22 in the S-shaped guide 21 provided in the corresponding introduction hole 20a. Thereafter, the respective fiber bundles 2 are introduced into the placement head 6 from the through hole 27a of the cylindrical member 27 in the support body 23 of the S-shaped guide 21. The respective fiber bundles 2 introduced into the placement head 6 are wound around the corresponding feeding rollers 18, and thereafter, are guided to the corresponding guide rollers 11.

As described above, the S-shaped guide 21 is provided to be rotatable around the center line of the introduction hole 20a with respect to the base member 20. In this manner, in the automated fiber bundle placement apparatus, when the placement head 6 is driven to turn by the pivoting mechanism 10, the S-shaped guide 21 connected to the tow guide 31 by the fiber bundle 2 pivots around the center line of the introduction hole 20a. However, the S-shaped guide 21 is also connected to the feeding roller 18 by the fiber bundle 2 on the downstream side (inside the placement head 6). Therefore, a pivoting amount does not have such a size that an orientation of a guide surface of the pair of rollers 22 and 22 in the S-shaped guide 21 is aligned with an orientation of a guide surface of the tow guide 31. Therefore, a twisted amount of the fiber bundle 2 introduced from the S-shaped guide 21 into the placement head 6 is smaller than that in a case where the fiber bundle 2 is introduced into the placement head 6 from the tow guide 31 without passing through the S-shaped guide 21.

In the automated fiber bundle placement apparatus according to the present embodiment, the regulation guide 24 is provided between the through hole 27a (introduction hole 20a) and the feeding roller 18. Each of the fiber bundles 2 introduced from the through hole 27a into the placement head 6 is guided to the corresponding feeding roller 18 in a manner in which each of the fiber bundles 2 is in sliding contact with both the regulation rollers 24a and 24a between the pair of regulation rollers 24a and 24a in the corresponding regulation guide 24. In this manner, the orientation of the fiber bundle 2 is in a state of being regulated by the regulation guide 24 (always has a constant orientation) between the regulation guide 24 and the feeding roller 18. Accordingly, even when the placement head 6 is driven to turn as described above, the orientation of the fiber bundle 2 reaching the feeding roller 18 is not changed.

In the automated fiber bundle placement apparatus of the present embodiment, the S-shaped guide 21 and the regulation guide 24 are provided between the tow guide 31 in the guide mechanism 19 and the feeding roller 18 in the placement head 6. Accordingly, compared to a case where the S-shaped guide 21 and the regulation guide 24 are not provided, the twisted amount of the fiber bundle 2 reaching the feeding roller 18 can be reduced. In this manner, in a case where the placement head 6 is driven to turn, in the automated fiber bundle placement apparatus that does not include the S-shaped guide 21 and the regulation guide 24, the fiber bundle reaching the feeding roller (guide roller) is twisted in size which may cause a disadvantage in placing the fiber bundle. Even in this case, in the automated fiber bundle placement apparatus of the present embodiment, the twisted amount of the fiber bundle 2 reaching the feeding roller 18 can be reduced to such a size which does not cause the disadvantage in placing the fiber bundle 2. As a result, it is possible to prevent the disadvantage in placing the fiber bundle 2 which may be caused by the twisted state.

Hitherto, the embodiment (example) of the present invention has been described. However, the automated fiber bundle placement apparatus of the present invention is not limited to the configuration described in the embodiment, and embodiments (modification examples) can also be adopted as follows.

(1) In the above-described embodiment, the placement head 6 is configured to include the regulation guide 24 between the guide roller 11 and the introduction hole 20a, and to include the feeding roller 18 between the regulation guide 24 and the guide roller 11. However, in the present invention, without being limited to the configuration, the placement head may be configured not to include the regulation guide and/or the feeding roller. Even when the configuration is adopted, the S-shaped roller is connected to at least the guide roller by the fiber bundle on the downstream side. Therefore, even when the configurations are adopted, the twisted amount of the fiber bundle reaching the guide roller can be reduced.

(2) According to an aspect of the automated fiber bundle placement apparatus, in the above-described embodiment, the automated fiber bundle placement apparatus is configured so that so that the placement of 16 fiber bundles 2 can be simultaneously performed. In the automated fiber bundle placement apparatus, the guide mechanism 19 attached to the arm 7a of the articulated robot 7 divides the routes of the 16 fiber bundles 2 into four groups of every four on the upstream side of the placement head 6. In the above-described embodiment, the introduction holes 20a are formed in the placement head 6 so that every four are aligned in four rows in a form corresponding to the routes divided into the four groups. The placement head 6 is configured so that the routes of the fiber bundles 2 which are divided into four groups and introduced into the placement head 6 are internally arranged in two groups by the two guide rollers 11. However, the automated fiber bundle placement apparatus according to an aspect of the present invention is not limited to the configuration in which the routes are divided in this form.

First, with regard to the automated fiber bundle placement apparatus, the number of the fiber bundles that can be simultaneously placed is not particularly limited in the present invention. That is, the number of the fiber bundles is not limited to 16 as in the above-described embodiment.

The guide mechanism is not limited to the configuration in which the routes of multiple (16) fiber bundles are guided by being divided into the four rows (four groups) as in the above embodiment. The guide mechanism may be configured so that the routes of the fiber bundles are divided into any two or more groups. Specifically, in a case where the number of the fiber bundles is 16 as in the above embodiment, for example, the guide mechanism may be configured so that the 16 fiber bundles are divided into two groups of every eight fiber bundles. Further, the guide mechanism may be configured to guide the fiber bundles without dividing the routes into the groups.

With regard to the introduction holes formed in the placement head, a formation position (alignment) thereof may basically take into consideration of a state of the routes of the fiber bundle 2 on the upstream side of the placement head. However, without being limited to the configuration in which a dived state of the routes coincides with that in the above-described embodiment, the placement can be performed in any desired way. For example, the introduction holes may be formed in two rows so that the routes divided into four groups in the guide mechanism as in the above-described embodiment are arranged in two groups. Alternatively, the introduction holes may be formed in four rows so that the routes divided into the two groups in the guide mechanism are further divided into four groups.

With regard to the routes of the fiber bundles defined by the above-described configuration, in a case where the automated fiber bundle placement apparatus is configured so that multiple fiber bundles can be simultaneously placed as in the above embodiment, in order to avoid a size increase in the placement head in relation to the number of the fiber bundles, it is preferable that the guide mechanism or the placement head is configured to divide the routes into a plurality of groups inside the placement head. However, as long as the size of the placement head is acceptable as a device in relation to the configuration of the device included inside the placement head, even in a case where the number of the fiber bundles to be placed is large as in the above-described embodiment, the guide mechanism or the placement head may be configured so that the routes are located at the same position inside the placement head in the back and forth direction without dividing the routes into the plurality of groups as described above.

In the automated fiber bundle placement apparatus according to an aspect of the present invention, the number of the fiber bundles to be simultaneously placed as described above is not particularly limited. Therefore, depending on the number of the fiber bundles (case where the number is small), even when the routes are located at the same position inside the placement head, the size of the placement head does not increase, compared to that of the above-described embodiment. However, even in a case where the number of the fiber bundles to be placed is small, the guide mechanism or the placement head may be configured so that the routes inside the placement head are divided into a plurality of locations in the back and forth direction. As described above, the configuration for the routes in the automated fiber bundle placement apparatus may be appropriately adopted in view of the number of the fiber bundles or the size of the placement head.

(3) With regard to the regulation guide, in the above-described embodiment, the regulation guide 24 is provided so that the regulation roller 24a as the regulation member extends in the width direction of the placement head 6. In this manner, the regulation guide 24 is configured to be common to all of the introduction holes aligned in the width direction. However, the regulation guide is not limited to the configuration. The regulation guide may be configured to be common to two or more of the plurality of introduction holes aligned in the width direction, which are smaller than the total number (for example, two introduction holes adjacent to each other). Alternatively, the regulation guide may be configured to be individually provided for each of the introduction holes (each of the routes).

With reward to the pair of regulation members configuring the regulation guide, in the above-described embodiment, each of the regulation member is the regulation roller 24a configured so that the roller member 24b serving as a portion in sliding contact with the fiber bundle 2 is supported to be rotatable. That is, each of the regulation members is a roll-shaped member configured so that the portion in sliding contact with the fiber bundle 2 is rotatable. However, the regulation member configuring the regulation guide may be provided in a form of pinching the fiber bundle so that the fiber bundle is in sliding contact therewith. A structure or a shape thereof is not particularly limited. For example, the regulation member may be a simple roll-shaped. (cylindrical) or columnar member, and may be supported not to be rotatable by the placement head. The regulation member may not be a member having a circular cross section, and may be a leaf spring.

The present invention is not limited to the examples described above, and can be appropriately modified within the scope not departing from the concept of the present invention.

What is claimed is:

1. An automated fiber bundle placement apparatus comprising:
   a supply device in which a plurality of bobbins around which fiber bundles are wound are installed, and configured to supply the fiber bundles from each of the bobbins;
   a placement head for placing each of the fiber bundles supplied from the supply device on a placement die, the placement head including a pressing unit that presses the fiber bundle onto the placement die;
   an articulated robot moving the placement head for the placement, the articulated robot having the placement head attached to the articulated robot via a pivoting mechanism in which the placement head is attached to a pivotally driven pivoting unit; and
   a guide mechanism provided in the articulated robot, the guide mechanism guiding the fiber bundle supplied from the supply device toward the placement head,
   wherein the placement head includes
      an introduction hole for introducing the fiber bundle guided from the guide mechanism into the placement head, the introduction hole being formed for each of the fiber bundles,
      a plurality of feeding mechanisms provided for each route of the fiber bundle to feed the fiber bundle introduced from the introduction hole toward the pressing unit, and
      a guide roller provided on an upstream side of the route with respect to the feeding mechanisms in a form corresponding to each of the feeding mechanisms, and
   wherein the placement head further includes an S-shaped guide provided for each of the introduction holes, the S-shaped guide having:

a pair of rollers provided so that axes of the pair of rollers are parallel to each other, and having different positions in a direction of a center line of the introduction hole, the pair of rollers being provided so as to be positioned on an upstream side of the route with respect to the introduction hole; and a support body supporting the pair of rollers and provided to be rotatable around the center line.

2. The automated fiber bundle placement apparatus according to claim 1, wherein the placement head includes a regulation guide provided between the guide roller and the introduction hole, the regulation guide having a pair of regulation members provided to pinch the fiber bundle therebetween so that the fiber bundle is in sliding contact with the pair of regulation members.

3. The automated fiber bundle placement apparatus according to claim 2, wherein the regulation guide is configured to be common to two or more of the routes by the regulation members extending in a width direction of the placement head.

* * * * *